(12) United States Patent
Sanchez Cruz et al.

(10) Patent No.: US 8,632,117 B1
(45) Date of Patent: Jan. 21, 2014

(54) ARMREST ASSEMBLIES FOR VEHICLE DOORS

(75) Inventors: Jose A. Sanchez Cruz, Atizapan de Zaragoza (MX); Christian Ibanez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/558,646

(22) Filed: Jul. 26, 2012

(51) Int. Cl.
*B60J 9/00* (2006.01)

(52) U.S. Cl.
USPC ......................................................... 296/153

(58) Field of Classification Search
USPC ........... 296/153; 244/118.6; 297/115, 188.16, 297/188.19, 232, 411.2, 411.32, 411.36, 297/411.38; 248/311.2
See application file for complete search history.

(56) References Cited

U.S. PATENT DOCUMENTS

| | | | | |
|---|---|---|---|---|
| 4,456,644 A | * | 6/1984 | Janz et al. ...................... | 428/158 |
| 4,783,114 A | * | 11/1988 | Welch ............................ | 296/153 |
| 5,445,430 A | * | 8/1995 | Nichols ......................... | 296/153 |
| 5,626,382 A | * | 5/1997 | Johnson et al. ............ | 296/146.7 |
| 6,568,743 B1 | * | 5/2003 | Jayasuriya et al. ........... | 296/153 |
| 6,840,566 B2 | * | 1/2005 | Bruton .......................... | 296/153 |
| 7,503,621 B2 | * | 3/2009 | Mani ....................... | 296/187.05 |
| 7,775,584 B2 | * | 8/2010 | Hughes et al. ........... | 296/187.05 |
| 7,828,388 B2 | * | 11/2010 | Thomas ................... | 297/411.21 |
| 8,083,283 B2 | * | 12/2011 | Bailey et al. ................ | 296/153 |
| 8,123,280 B2 | * | 2/2012 | Hori et al. ..................... | 296/153 |
| 8,172,311 B2 | * | 5/2012 | Hughes et al. ........... | 296/187.05 |
| 8,297,675 B2 | * | 10/2012 | Someschan et al. ......... | 296/1.08 |
| 2004/0229013 A1 | * | 11/2004 | Dooley et al. ................ | 428/138 |
| 2005/0194806 A1 | * | 9/2005 | Cowelchuk et al. ......... | 296/1.09 |
| 2005/0200161 A1 | * | 9/2005 | Reed et al. .................... | 296/153 |
| 2006/0082175 A1 | * | 4/2006 | Cowelchuk et al. ......... | 296/1.09 |
| 2006/0154028 A1 | * | 7/2006 | Dooley et al. ................ | 428/138 |
| 2006/0200960 A1 | * | 9/2006 | Reed et al. ..................... | 29/91.1 |
| 2007/0069548 A1 | * | 3/2007 | Dooley et al. ............. | 296/146.7 |
| 2007/0132272 A1 | * | 6/2007 | Adams et al. ................. | 296/153 |
| 2007/0207292 A1 | * | 9/2007 | Cowelchuk et al. .......... | 428/174 |
| 2009/0295011 A1 | * | 12/2009 | Smith et al. ................... | 264/101 |
| 2010/0171333 A1 | * | 7/2010 | Smith et al. ................. | 296/1.08 |
| 2010/0215941 A1 | * | 8/2010 | Bozio et al. ................ | 428/304.4 |
| 2011/0139338 A1 | * | 6/2011 | Fox ................................. | 156/70 |

* cited by examiner

*Primary Examiner* — Kiran B Patel

(74) *Attorney, Agent, or Firm* — Quinn Law Group, PLLC

(57) ABSTRACT

An armrest assembly for a door of a vehicle includes a substrate component configured for attachment to the door and defining a plurality of furrows. The armrest assembly further includes a cover component mated to the substrate component, wherein the cover component is formed from a foam and fills each of the plurality of furrows. A vehicle including the armrest assembly is also disclosed.

15 Claims, 4 Drawing Sheets

ARMREST ASSEMBLIES FOR VEHICLE DOORS

TECHNICAL FIELD

The present disclosure generally relates to armrest assemblies, and more specifically, to armrest assemblies for a door of a vehicle.

BACKGROUND

Vehicles generally include components designed to enhance occupant comfort. For example, a vehicle armrest assembly may be designed to support an elbow and/or a forearm of an occupant during vehicle use. Such components may also complement an aesthetic theme or design of the vehicle.

SUMMARY

An armrest assembly for a door of a vehicle includes a substrate component configured for attachment to the door and defining a plurality of furrows. The armrest assembly also includes a cover component mated to the substrate component, wherein the cover component is formed from a foam and fills each of the plurality of furrows.

In one embodiment, the substrate component has a longitudinal axis and includes a first portion having a first surface defining the plurality of furrows. Each of the plurality of furrows is disposed substantially parallel to the longitudinal axis so that the first surface has an undulating configuration. The substrate component also includes a second portion extending away from the first portion along the longitudinal axis. In addition, the armrest assembly includes a skin, and the cover component is sandwiched between the substrate component and the skin. The armrest assembly exhibits a first deflection upon application of a force in a first direction to the plurality of furrows. The first direction is substantially perpendicular to the longitudinal axis. The armrest assembly exhibits a second deflection upon application of the force in a second direction to the plurality of furrows. The second direction is substantially perpendicular to the first direction and the longitudinal axis. Further, the first deflection is less than the second deflection.

A vehicle includes a body, a door pivotably attached to the body, and an armrest assembly attached to the door. The armrest assembly includes a substrate component configured for attachment to the door and defining a plurality of furrows. The armrest assembly also includes a cover component mated to the substrate component, wherein the cover component is formed from a foam and fills each of the plurality of furrows.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
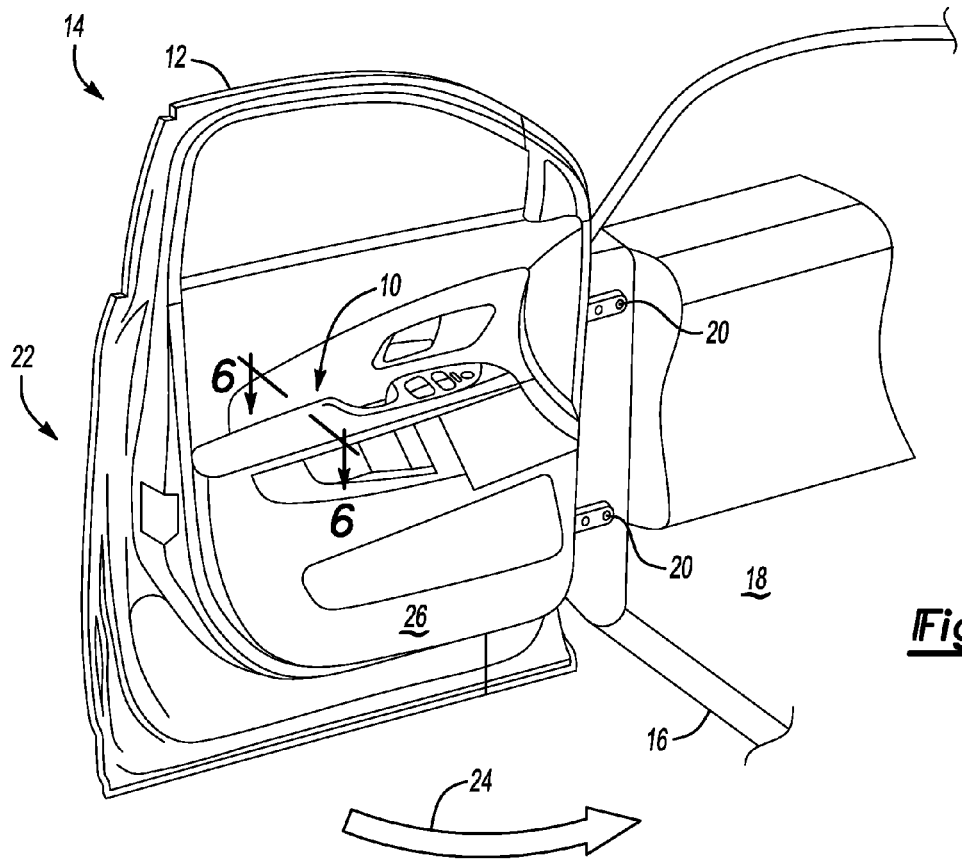
FIG. 1 is a schematic perspective fragmentary illustration of an armrest assembly for a door of a vehicle.

Referring to the Figures, wherein like reference numerals refer to like elements, an armrest assembly 10 for a door 12 of a vehicle 14 is shown generally in FIG. 1. The armrest assembly 10 may be useful for automotive vehicles such as passenger sedans and sport utility vehicles, and may support an occupant (not shown) of the vehicle 14. For example, the armrest assembly 10 may support an elbow (not shown) and/or a forearm (not shown) of the vehicle occupant. However, the armrest assembly 10 may also be useful for non-automotive applications including, for example, recreational vehicles, construction vehicles, and aviation vehicles.

Directional terminology used herein pertaining to the vehicle 14 is understood by one skilled in the art. For example, terminology such as "front", "forward", and "fore" generally refers to a leading portion of the vehicle 14 with respect to a direction of vehicle travel. Likewise, terminology such as "rear", "rearward", and "aft" generally refers to a trailing portion of the vehicle 14 with respect to the direction of vehicle travel. As shown in FIG. 1, the vehicle 14 includes a body 16 defining an interior passenger compartment (shown generally at 18), and components not disposed within the passenger compartment 18 are generally referenced as the body 16 or exterior of the vehicle 14.

With continued reference to FIG. 1, the vehicle 14 also includes the door 12 pivotably attached to the body 16. That is, the door 12 may be configured to pivot on one or more hinges 20 between an open position (shown generally at 22 in FIG. 1) and a closed position (indicated generally by arrow 24 in FIG. 1) to alternatingly provide access to, and seal off or enclose, the passenger compartment 18. As such, the door 12 may be a passenger-side door or a driver-side door of the vehicle 14.

As described with reference to FIG. 1, the vehicle 14 also includes the armrest assembly 10 attached to the door 12. In particular, the armrest assembly 10 may be attached to an inner portion (shown generally at 26 in FIG. 1) of the door 12, and may therefore be disposed within the passenger compartment 18 when the door 12 is pivoted to the closed position 24.

Figure 3:
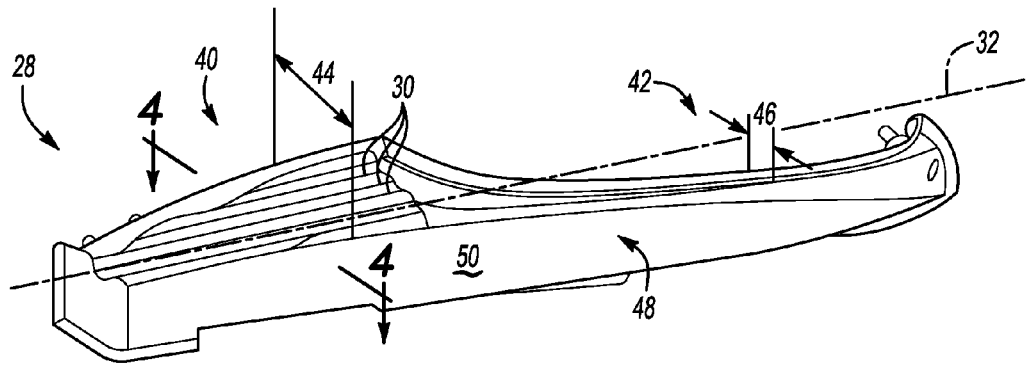
FIG. 3 is a schematic perspective illustration of the substrate component of FIGS. 1 and 2.

Referring now to FIG. 3, the armrest assembly 10 (FIG. 1) includes a substrate component 28 configured for attachment to the door 12 (FIG. 1). The substrate component 28 may provide the armrest assembly 10 with structure and strength, as set forth in more detail below. As such, the substrate component 28 may be formed from any suitable material, such as, but not limited to, plastic, composite, metal, and combinations thereof. In one embodiment, the substrate component 28 may be formed from an injection moldable plastic, such as, but not limited to, acrylonitrile butadiene styrene. Further, the substrate component 28 may be attached to the door 12 (FIG. 1) in any suitable manner. For example, the substrate component 28 may include one or more attachment elements (not shown) and/or may be fixedly attached to the door 12 via, for example, one or more adhesives, bolts, screws, pegs, and combinations thereof.

Referring again to FIG. 3, the substrate component 28 defines a plurality of furrows 30. More specifically, the substrate component 28 may have a longitudinal axis 32, and each of the plurality of furrows 30 may be disposed substantially parallel to the longitudinal axis 32. In particular, the longitudinal axis 32 may be generally parallel to a direction of vehicle travel when the door 12 (FIG. 1) is disposed in the closed position 24 (FIG. 1). As such, the plurality of furrows 30 may be situated or disposed longitudinally along the substrate component 28.

Figure 4:
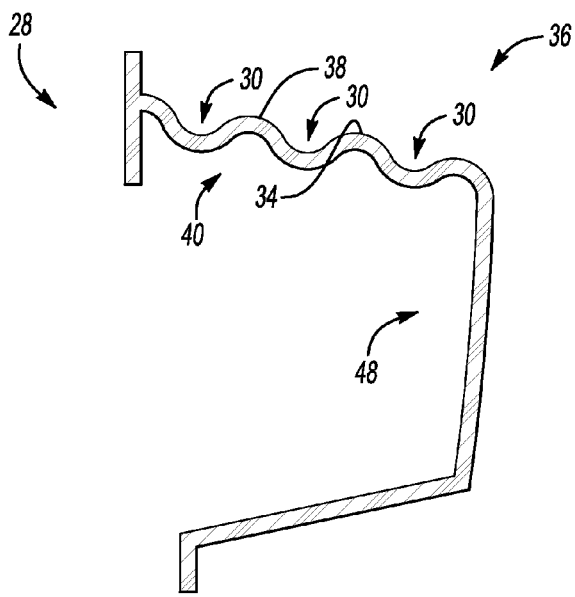
FIG. 4 is a schematic cross-sectional illustration of the substrate component of FIG. 3, taken along section lines 4-4.

Referring now to FIGS. 3 and 4, each of the plurality of furrows 30 may be disposed substantially parallel to every other one of the plurality of furrows 30. In addition, each of the plurality of furrows 30 may be disposed adjacent another one of the plurality of furrows 30. As such, as best shown in FIG. 4, the substrate component 28 may have a first surface 34 defining the plurality of furrows 30, and the first surface 34 may have an undulating configuration (shown generally at 36 in FIG. 4). That is, the first surface 34 may be characterized as wavy or ruffled.

More specifically, with continued reference to FIG. 4, the first surface 34 may form a sine wave (denoted generally at 38) so that the substrate component 28 has a sinusoidal cross-section (shown in FIG. 4) in a plane (represented by section lines 4-4 in FIG. 3) that is substantially perpendicular to the longitudinal axis 32 (FIG. 3). Stated differently, each of the plurality of furrows 30 may be disposed substantially parallel to the longitudinal axis 32 so that the first surface 34 has the undulating configuration 36. Without intending to be limited by theory, the sinusoidal first surface 34 may contribute to excellent strength and energy dissipation characteristics of the armrest assembly 10, as set forth in more detail below. Further, the first surface 34 may be referred to as an upper surface when the armrest assembly 10 (FIG. 1) is installed in the vehicle 14 (FIG. 1), i.e., attached to the door 12 (FIG. 1). In addition, the first surface 34 may not define a plurality of voids (not shown) therein. That is, the first surface 34 may not be a mesh, screen, or lattice, but may rather be solid, continuous, and have a rippled appearance as defined by the plurality of furrows 30.

Referring again to FIG. 3, the substrate component 28 may include a first portion 40 defining the plurality of furrows 30. The first portion 40 may be configured for generally supporting an elbow (not shown) of the occupant (not shown). The substrate component 28 may further include a second portion 42 extending away from the first portion 40 along the longitudinal axis 32. That is, the second portion 42 may have an elongated, curvilinear shape and may be suitable for supporting a forearm (not shown) of the vehicle occupant (not shown). It is to be appreciated that a shape of both the first portion 40 and the second portion 42 may be determined according to vehicle styling. For example, although not limited to the arrangement or shape shown in FIG. 3, the second portion 42 may form a hook that may be useful as a grab bar so that the vehicle occupant (not shown) may pivot the door 12 (FIG. 1) between the open position 22 (FIG. 1) and the closed position 24 (FIG. 1).

However, with continued reference to FIG. 3, the first portion 40 may have a first average width 44 that is greater than a second average width 46 of the second portion 42. Further, the first portion 40 and the second portion 42 may be integral, i.e., may form a single piece. As such, the first portion 40 and the second portion 42 may be formed from the same material, e.g., an injection-moldable plastic.

Referring again to FIG. 3, the substrate component 28 may further include an apron portion 48 having an exterior surface 50 and extending from the first portion 40 and the second portion 42. That is, the apron portion 48 may form a skirt or side portion of the substrate component 28. Generally, the exterior surface 50 of the apron portion 48 may face, i.e., be spaced opposite, a torso (not shown) or side of the vehicle occupant (not shown) when the vehicle occupant is disposed in a seated position within the passenger compartment 18 (FIG. 1), and the door 12 (FIG. 1) is disposed in the closed position 24 (FIG. 1).

Figure 2:
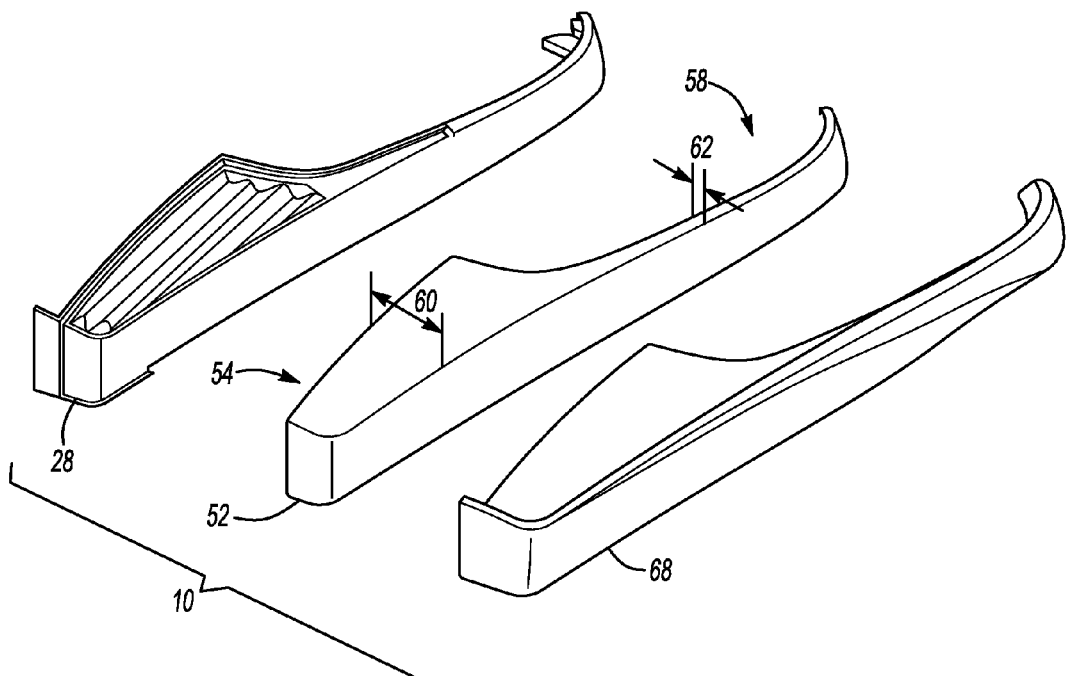
FIG. 2 is a schematic perspective illustration of an exploded view of the armrest assembly of FIG. 1, wherein the armrest assembly includes a substrate component and a cover component.
Figure 6:
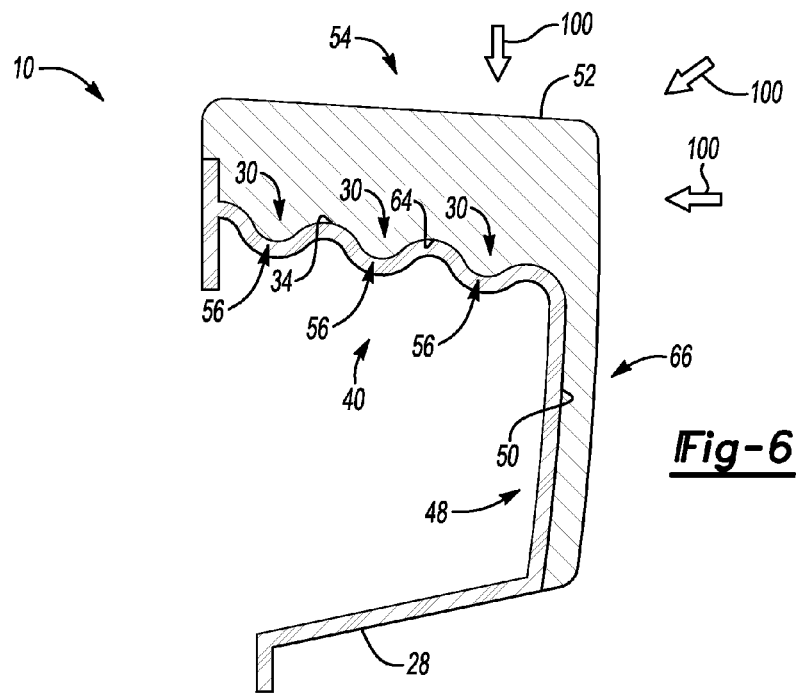
FIG. 6 is a schematic cross-sectional illustration of the armrest assembly of FIG. 1, taken along section lines 6-6.

As best shown in FIGS. 2 and 6, the armrest assembly 10 also includes a cover component 52 mated to the substrate component 28, wherein the cover component 52 is formed from a foam and fills each of the plurality of furrows 30 (FIG. 6). That is, referring to FIG. 6, the cover component 52 may be disposed on the substrate component 28 and may be configured to define an overall shape of the armrest assembly 10. The cover component 52 may be formed from any foam, such as, but not limited to, a polyurethane foam. Further, the cover component 52 may be foamed-in-place upon the substrate component 28, as set forth in more detail below. That is, the foam of the cover component 52 may be deposited and cured directly onto the substrate component 52, rather than first forming the cover component 52 and subsequently attaching the cover component 52 to the substrate component 28.

With continued reference to FIG. 6, the cover component 52 may provide a comparatively soft covering upon which the vehicle occupant (not shown) may rest an elbow (not shown) and/or forearm (not shown). That is, the cover component 52 may be a cushion, whereas the substrate component 28 may be a skeletal frame of the armrest assembly 10. More specifically, the substrate component 28 may have a first density, and the cover component 52 may have a second density that is less than the first density. For example, in one non-limiting embodiment, the substrate component 28 may be formed from plastic, and the first density may be from about 1 g/cm$^3$ to about 1.5 g/cm$^3$, e.g., from about 1.1 g/cm$^3$ to about 1.2 g/cm$^3$. In contrast, the cover component 52 may be formed from foam, and the second density may be from about 0.005 g/cm$^3$ to about 0.1 g/cm$^3$, e.g., from about 0.006 g/cm$^3$ to about 0.075 g/cm$^3$. Accordingly, the cover component 52 may be comparatively more resilient and deformable than the substrate component 28.

Figure 5:
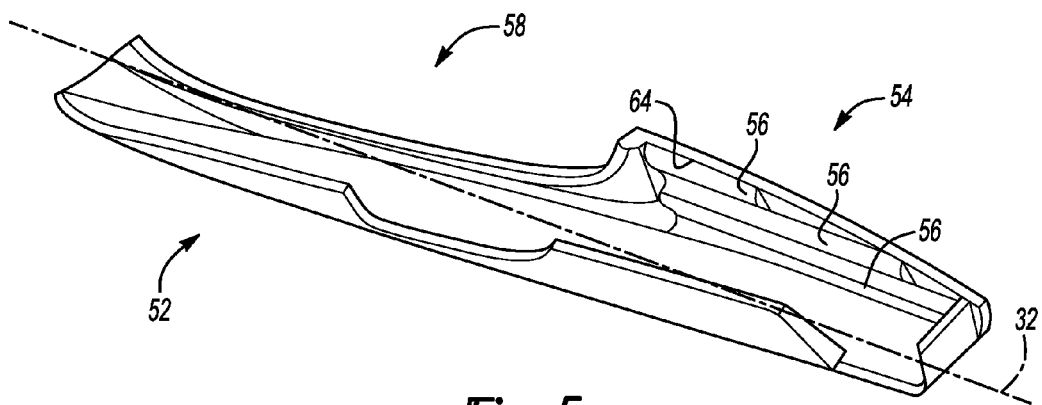
FIG. 5 is a schematic perspective illustration of a bottom view of the cover component of FIGS. 1 and 2.

Referring now to FIG. 5, the cover component 52 may include a third portion 54 having a second surface 64 and configured for covering the first portion 40 (FIG. 3). Generally, the third portion 54 may be configured for supporting an elbow (not shown) of the occupant (not shown). Further, the third portion 54 may have a plurality of projections 56 extending therefrom so that the second surface 64 forms the sine wave 38 (FIG. 4). Therefore, as best shown in FIG. 6, each of the plurality of projections 56 may be matable with a respective one of the plurality of furrows 30. In particular, each of the plurality of projections 56 may contact and fill a corresponding one of the plurality of furrows 30 so that the substrate component 28 mates with the cover component 52. That is, the cover component 52 may contact the substrate component 28 when the armrest assembly 10 is attached to the door 12 (FIG. 1) of the vehicle 14 (FIG. 1).

Referring again to FIG. 5, the cover component 52 may further include a fourth portion 58 configured for covering the second portion 42 (FIG. 3), wherein the fourth portion 58 extends away from the third portion 54 along the longitudinal axis 32. That is, the fourth portion 58 may have an elongated, curvilinear shape and may be suitable for supporting a forearm (not shown) of the vehicle occupant (not shown). It is to be appreciated that a shape of both the third portion 54 and the fourth portion 58 may be determined according to the shape of the first portion 40 (FIG. 3) and the second portion 42 (FIG. 3), respectively, and/or according to styling of the vehicle 14 (FIG. 1). For example, although not limited to the arrangement or shape shown in FIG. 5, the fourth portion 58 may form a hook that may be useful as a grab bar so that the vehicle occupant (not shown) may pivot the door 12 (FIG. 1) between the open position 22 (FIG. 1) and the closed position 24 (FIG. 1).

As best shown in FIG. 2, the third portion 54 may have a third average width 60 that is greater than a fourth average width 62 (also best shown in FIG. 2) of the fourth portion 58. Therefore, the cover component 52 and the substrate component 28 may be similarly shaped. Alternatively, the cover component 52 may have a different overall shape than the substrate component 28, according to desired vehicle styling. For example, the cover component 52 may be wider and/or longer than the substrate component 28. Nonetheless, referring to FIGS. 3 and 5, when assembled, the third portion 54 (FIG. 5) may cover the first portion 40 (FIG. 3), and the fourth portion 58 (FIG. 5) may cover the second portion 42 (FIG. 3). Further, as shown in FIG. 5, the third portion 54 and the fourth portion 58 may be integral, i.e., may form a single piece. As such, the third portion 54 and the fourth portion 58 may be formed from foam.

Referring again to FIG. 6, each of the plurality of projections 56 and each of the corresponding one of the plurality of furrows 30 may be complementarily shaped. For example, the plurality of projections 56 may together form a second surface 64 having a sinusoidal cross-section. That is, each of the plurality of projections 56 may pair with a corresponding one of the plurality of furrows 30 so that the cover component 52 mates with the substrate component 28. More specifically, each of the plurality of furrows 30 may fill a respective one of the plurality of projections 56 so that the first surface 34 contacts the second surface 64. Therefore, the cover component 52 may be disposed in contact with the first portion 40 and each of the plurality of furrows 30.

With continued reference to FIG. 6, since the cover component 52 is disposed in contact with each of the plurality of furrows 30, each of the plurality of furrows 30 may contact a respective one of the plurality of projections 56 so that the first surface 34 mates with the second surface 64. That is, as set forth above, the first surface 34 may not define a plurality of voids (not shown) therethrough. For example, the first surface 34 may not define a plurality of holes therethrough having a honeycomb shape (not shown). Therefore, the cover component 52, e.g., the second surface 64, may contact each of the plurality of furrows 30 and may not extend or protrude through the first surface 34. Rather, the cover component 52 may be supported by the substrate component 28.

With continued reference to FIG. 6, the cover component 52 may therefore be foamed in place upon the substrate component 28, e.g., the first surface 34, to form the armrest assembly 10. As such, it may not be necessary to cover the first surface 34 with a film (not shown) before forming the cover component 52 on the substrate component 28. Stated differently, the armrest assembly 10 may be free from any film disposed between the substrate component 28 and the cover component 52, and the first surface 34 may support the foam of the cover component 52. As such, the armrest assembly 10 is economical to manufacture.

In addition, with continued reference to FIG. 6, the plurality of furrows 30 may not be visible through the third portion 54, e.g., when viewed from the direction of arrow 100. That is, the armrest assembly 10 may be free from any indication, e.g., a witness line or unevenness, that the first portion 40 and the plurality of furrows 30 are covered by the third portion 54. As such, the armrest assembly 10 may be aesthetically pleasing to the vehicle occupant (not shown), and may be selected for use in luxury vehicles.

Referring again to FIG. 6, for embodiments including the apron portion 48 having the exterior surface 50, the cover component 52 may abut the exterior surface 50. That is, the cover component 52 may also form a skirt or side portion of the armrest assembly 10. For example, the cover component 52 may include a contact portion 66 that abuts the apron portion 48. The contact portion 66 may face, i.e., be spaced opposite, a torso (not shown) or side of the vehicle occupant (not shown) when the vehicle occupant is disposed in a seated position within the passenger compartment 18 (FIG. 1), and the door 12 (FIG. 1) is disposed in the closed position 24 (FIG. 1).

Referring again to FIG. 2, the armrest assembly 10 may further include a skin 68 disposed on the cover component 52 so that the cover component 52 is sandwiched between the skin 68 and the substrate component 28. The skin 68 may also be selected according to vehicle styling and may provide the armrest assembly 10 with texture and/or color. For example, the skin 68 may be formed from polyvinylchloride, vinyl, leather, or combinations thereof, and may be stitched, adhered, and/or otherwise bonded to the cover component 52 to enhance the appearance of the armrest assembly 10 and/or complement an aesthetic theme or design of the vehicle 14 (FIG. 1).

Figure 7A:
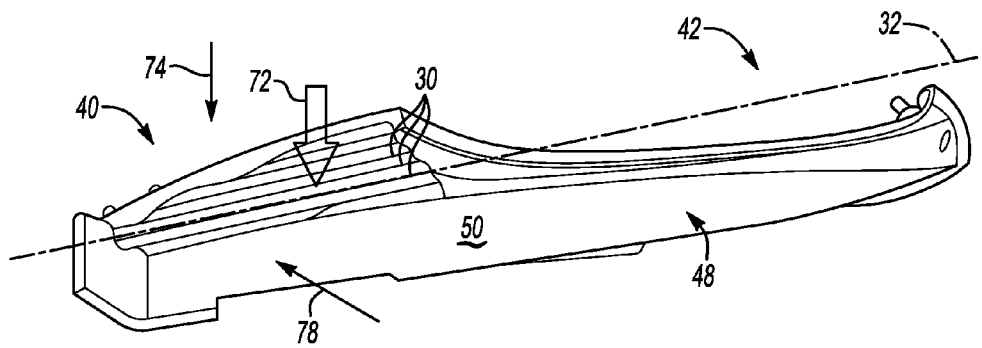
FIG. 7A is a schematic perspective illustration of a force applied to the substrate component of FIGS. 1 and 2 in a first direction.

Referring now to FIGS. 7A-8B, the plurality of furrows 30 may contribute to the excellent strength and energy dissipation characteristics of the armrest assembly 10. More specifically, referring to FIGS. 7A and 7B, the armrest assembly 10 (FIG. 1) may exhibit a first deflection 70 (FIG. 7B) upon application of a force (denoted generally by arrow 72 in FIG. 7A) in a first direction 74 to the plurality of furrows 30 (FIG. 7A). The first direction 74 may be substantially perpendicular to the longitudinal axis 32. For example, the force 72 may be applied to the plurality of furrows 30 in the first direction 74 by an elbow of the vehicle occupant. Further, referring to FIGS. 8A and 8B, the armrest assembly 10 may exhibit a second deflection 76 (FIG. 8B) upon application of the force 72 in a second direction 78 (FIG. 7A) to the plurality of furrows 30. The second direction 78 (FIG. 7A) may be substantially perpendicular to both the first direction 74 (FIG. 7A) and the longitudinal axis 32. For example, the force 72 may be applied to the plurality of furrows 30 in the second direction 78 by a torso or side of the vehicle occupant.

Figure 7B:
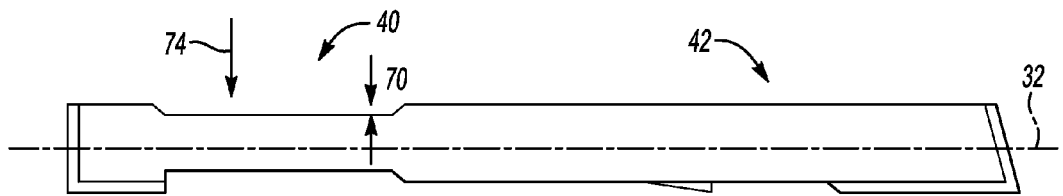
FIG. 7B is a schematic illustration of a side view of the substrate component of FIG. 7A after the force of FIG. 7A is removed from the substrate component.
Figure 8A:
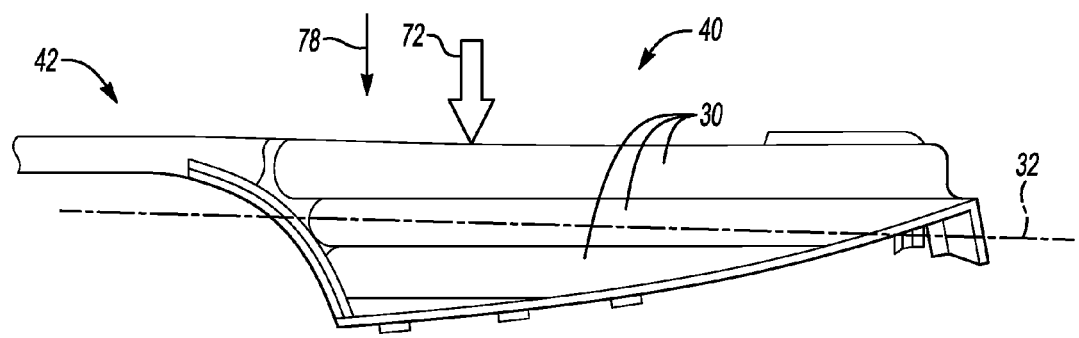
FIG. 8A is a schematic perspective illustration of the force of FIG. 7A applied to the substrate component of FIG. 7A in a second direction.
Figure 8B:
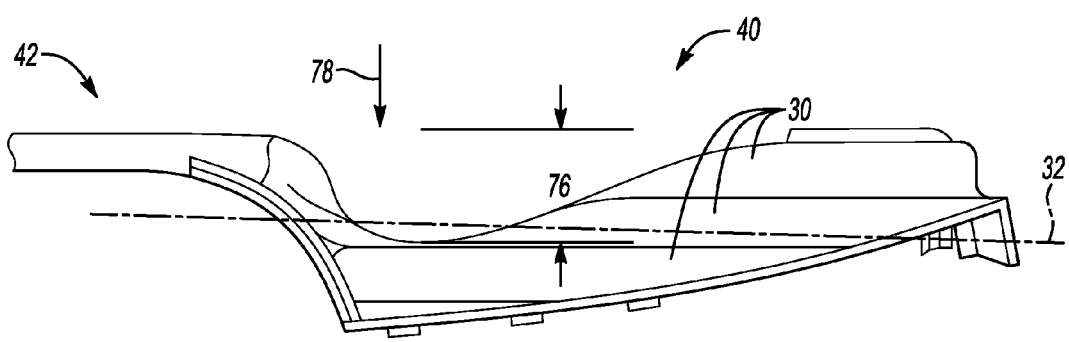
FIG. 8B is a schematic illustration of a side view of the substrate component of FIG. 8A after the force of FIG. 8A is removed from the substrate component.

With continued reference to FIGS. 7B and 8B, the first deflection 70 (FIG. 7B) may be less than the second deflection 76 (FIG. 8B). That is, the armrest assembly 10 (FIG. 1), e.g., the first portion 40, may deflect more in the second direction 78 than in the first direction 74 upon application of the force 72 (FIGS. 7A and 8A). As such, the armrest assembly 10 may exhibit excellent energy dissipation characteristics in the second direction 78 when the force 72 is applied to the plurality of furrows 30. For example, the first portion 40 may deform in response to the force 72 applied in the second direction 78.

Referring again to FIGS. 7A and 8A, the force 72 applied to the first portion 40 in each of the first direction 74 (FIG. 7A)

and the second direction 78 (FIG. 8A) may be from about 0.5 kN to about 2 kN, e.g., about 1 kN. Further, as best shown in FIG. 7B, the first deflection 70 may be from about 1 mm to about 3 mm, e.g., about 1.5 mm. Therefore, the first portion 40 may remain relatively undeformed upon application of the force 72 in the first direction 74, but may deform and/or absorb energy upon application of the force 72 in the second direction 78. Consequently, the armrest assembly 10 may exhibit excellent strength, and may provide a firm yet comfortable support for the elbow and/or forearm of the vehicle occupant (not shown).

Referring now to FIG. 8B, the second deflection 76 may be from about 50 mm to about 100 mm, e.g., about 80 mm. That is, the first portion 40 may dissipate energy through deformation upon application of the force 72 (FIG. 8A) in the second direction 78 (FIG. 8A). As such, the armrest assembly 10 may exhibit excellent energy dissipation characteristics and may deform in the second direction 78 to absorb energy upon application of the force 72. As such, the plurality of furrows 30 may deform when the force 72 is applied in the second direction 78, yet may still provide a comfortable support for the vehicle occupant. That is, the plurality of furrows 30 (FIG. 3) may provide the armrest assembly 10 with the aforementioned strength, comfort, and energy dissipation capability.

Therefore, the armrest assembly 10 (FIG. 1) is aesthetically pleasing, provides a comfortable support for vehicle occupants, and is configured to absorb energy in the second direction 78. That is, the armrest assembly 10 provides excellent vertical support in the first direction 74 for vehicle occupants, and exhibits excellent lateral energy absorption in the second direction 78. Further, since the cover component 52 may be foamed-in-place on the substrate component 28, the armrest assembly 10 and vehicle 14 (FIG. 1) may be manufactured economically. That is, since the plurality of furrows 30 prevent the cover component 52 from extending through the first surface 34 of the substrate component 28, the armrest assembly 10 may eliminate inclusion of a film (not shown) between the cover component 52 and the substrate component 28.

While the best modes for carrying out the disclosure have been described in detail, those familiar with the art to which this disclosure relates will recognize various alternative designs and embodiments for practicing the disclosure within the scope of the appended claims.

The invention claimed is:

1. An armrest assembly for a door of a vehicle, the armrest assembly comprising:
   a substrate component configured for attachment to the door, wherein the substrate component defines a plurality of furrows and has a longitudinal axis; and
   a cover component mated to the substrate component, wherein the cover component is formed from a foam and fills each of the plurality of furrows;
   wherein the armrest assembly exhibits a first deflection upon application of a force in a first direction to the plurality of furrows, and exhibits a second deflection upon application of the force in a second direction to the plurality of furrows;
   wherein the first direction is substantially perpendicular to the longitudinal axis;
   wherein the second direction is substantially perpendicular to the first direction and the longitudinal axis; and
   further wherein the first deflection is less than the second deflection.

2. The armrest assembly of claim 1, wherein each of the plurality of furrows is disposed substantially parallel to the longitudinal axis.

3. The armrest assembly of claim 2, wherein the substrate component has a first surface defining the plurality of furrows, and further wherein the first surface is solid, continuous, and has a rippled appearance.

4. The armrest assembly of claim 3, wherein the first surface has a wavy configuration.

5. The armrest assembly of claim 3, wherein the first surface forms a sine wave.

6. The armrest assembly of claim 1, wherein the substrate component has a first density, and the cover component has a second density that is less than the first density.

7. The armrest assembly of claim 2, wherein the substrate component includes:
   a first portion defining the plurality of furrows; and
   a second portion extending away from the first portion along the longitudinal axis.

8. The armrest assembly of claim 7, wherein the cover component includes:
   a third portion configured for covering the first portion, wherein the third portion has a plurality of projections extending therefrom; and
   a fourth portion configured for covering the second portion, wherein the fourth portion extends away from the third portion along the longitudinal axis.

9. The armrest assembly of claim 8, wherein each of the plurality of projections contacts and fills a corresponding one of the plurality of furrows.

10. The armrest assembly of claim 8, wherein the third portion covers the plurality of furrows so that the plurality of furrows are hidden from view by the third portion.

11. The armrest assembly of claim 8, wherein the first portion and the second portion are integral.

12. The armrest assembly of claim 11, wherein the third portion and the fourth portion are integral.

13. The armrest assembly of claim 8, wherein the substrate component further includes an apron portion extending from the first portion and the second portion and having an exterior surface.

14. The armrest assembly of claim 13, wherein the cover component abuts the exterior surface.

15. The armrest assembly of claim 1, further including a skin disposed on the cover component so that the cover component is sandwiched between the skin and the substrate component.

* * * * *